(12) United States Patent
Fukada

(10) Patent No.: US 11,157,546 B2
(45) Date of Patent: Oct. 26, 2021

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Masanori Fukada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/668,269

(22) Filed: Oct. 30, 2019

(65) Prior Publication Data

US 2020/0142921 A1 May 7, 2020

(30) Foreign Application Priority Data

Nov. 1, 2018 (JP) .............................. JP2018-206876

(51) Int. Cl.
| | |
|---|---|
| *H04N 5/232* | (2006.01) |
| *H04N 1/00* | (2006.01) |
| *H04N 1/32* | (2006.01) |
| *H04N 101/00* | (2006.01) |
| *G06F 16/51* | (2019.01) |
| *H04L 29/08* | (2006.01) |

(52) U.S. Cl.
CPC .......... *G06F 16/51* (2019.01); *H04N 1/0097* (2013.01); *H04N 1/32106* (2013.01); *H04N 1/32448* (2013.01); *H04N 5/23229* (2013.01); *H04N 5/23245* (2013.01); *H04L 67/10* (2013.01); *H04N 1/32128* (2013.01); *H04N 2101/00* (2013.01); *H04N 2201/0084* (2013.01); *H04N 2201/3214* (2013.01); *H04N 2201/3215* (2013.01); *H04N 2201/3216* (2013.01); *H04N 2201/3225* (2013.01); *H04N 2201/3247* (2013.01)

(58) Field of Classification Search
CPC ............. H04N 1/0097; H04N 1/32103; H04N 1/32108; H04N 1/32448; H04N 5/23229; H04N 5/23245; H04N 5/232933; H04N 2207/3214; H04N 2207/3215; H04N 2207/3225; H04N 2207/3247
See application file for complete search history.

(56) References Cited

U.S. PATENT DOCUMENTS

2013/0278794 A1* 10/2013 Kuroiwa ............ H04N 1/32358
348/231.2
2016/0371265 A1 12/2016 Aksu

* cited by examiner

*Primary Examiner* — Daniel M Pasiewicz
(74) *Attorney, Agent, or Firm* — Venable LLP

(57) ABSTRACT

An information processing apparatus that generates a file in a prescribed image file format is provided. The information processing apparatus accepts a designation of a storage condition to be satisfied by image data to be stored in the prescribed image file format, obtains image data, and generates the file such that one or more image data included in the obtained image data and satisfying the storage condition are stored in one of the prescribed image file format and such that image data included in the obtained image data and not satisfying the storage condition is not stored in the one of the prescribed image file format.

17 Claims, 6 Drawing Sheets

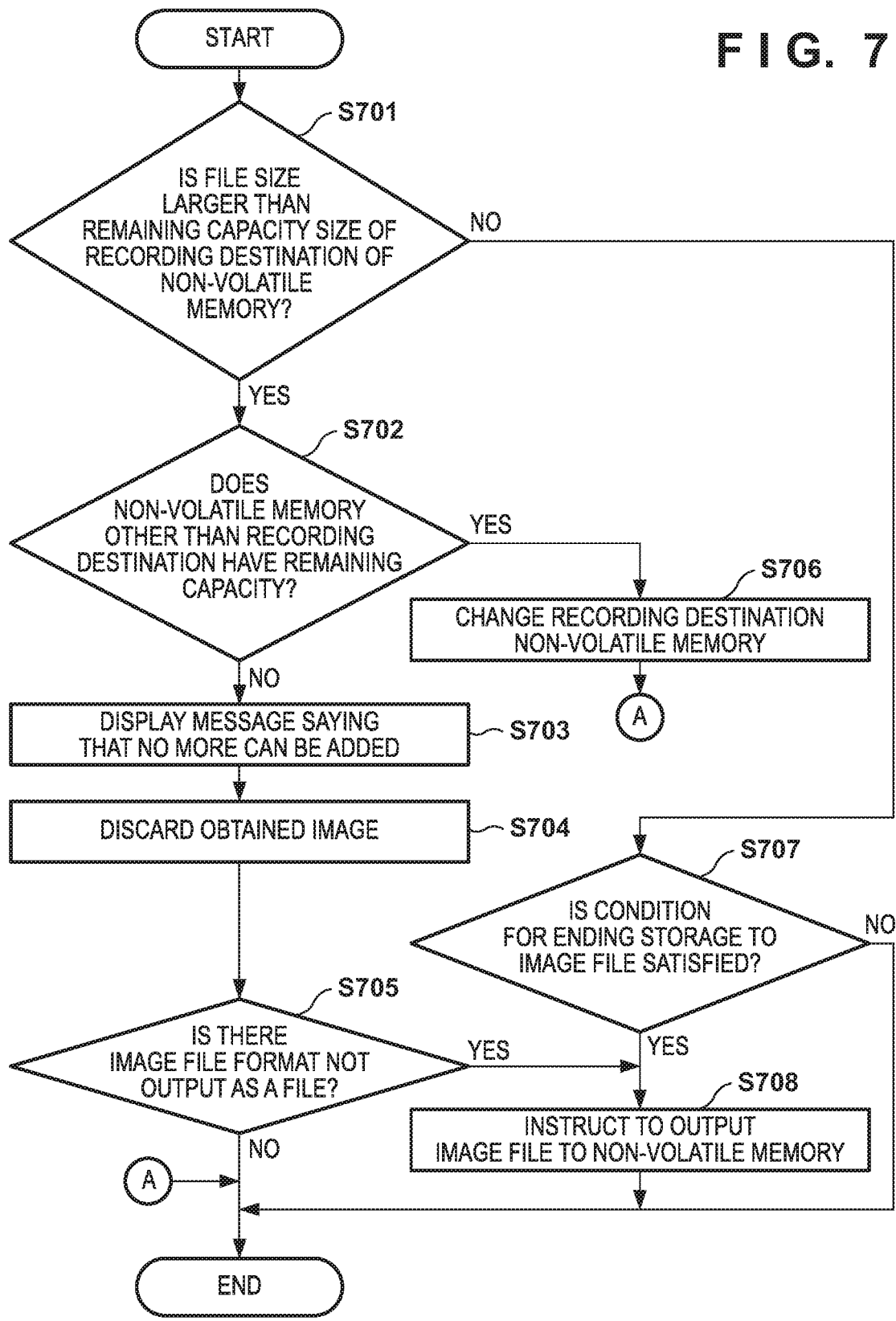

INFORMATION PROCESSING APPARATUS, CONTROL METHOD, AND STORAGE MEDIUM

BACKGROUND OF THE INVENTION

Field of the Invention

The present invention relates to a technology for generating a file containing one or more data.

Description of the Related Art

A standard referred to as a High Efficiency Image File Format (HEIF) has been developed to allow the storage, in one file, of one or more still images or of a sequence such as a burst of still images. The HEIF defines a normative structure including metadata, and also defines a method of associating metadata with an image; and a configuration of metadata of a particular format. Additionally, specification of US-2016-0371265 describes a method of dynamically storing and generating derivative images in the HEIF.

As described above, an HEIF file can include a plurality of image data, and a user can select, by editing, image data to store in the HEIF file. However, the editing is cumbersome and thus inconvenient.

SUMMARY OF THE INVENTION

The present invention provides a technique for improving the convenience for a user when the user generates one file that includes one or more data.

According to one aspect of the present invention, there is provided an information processing apparatus that generates a file in a prescribed image file format, the information processing apparatus comprising: one or more processors; and one or more memories coupled to the one or more processors, wherein the one or more memories store a computer-readable instruction that causes, when executed by the one or more processors, the information processing apparatus to: accept a designation of a storage condition to be satisfied by image data to be stored in the prescribed image file format; obtain image data; and generate the file such that one or more image data included in the obtained image data and satisfying the storage condition are stored in one of the prescribed image file format and such that image data included in the obtained image data and not satisfying the storage condition is not stored in the one of the prescribed image file format.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 is a diagram illustrating an example of a flow of image file format output determination processing.

DESCRIPTION OF THE EMBODIMENTS

Figure 1:
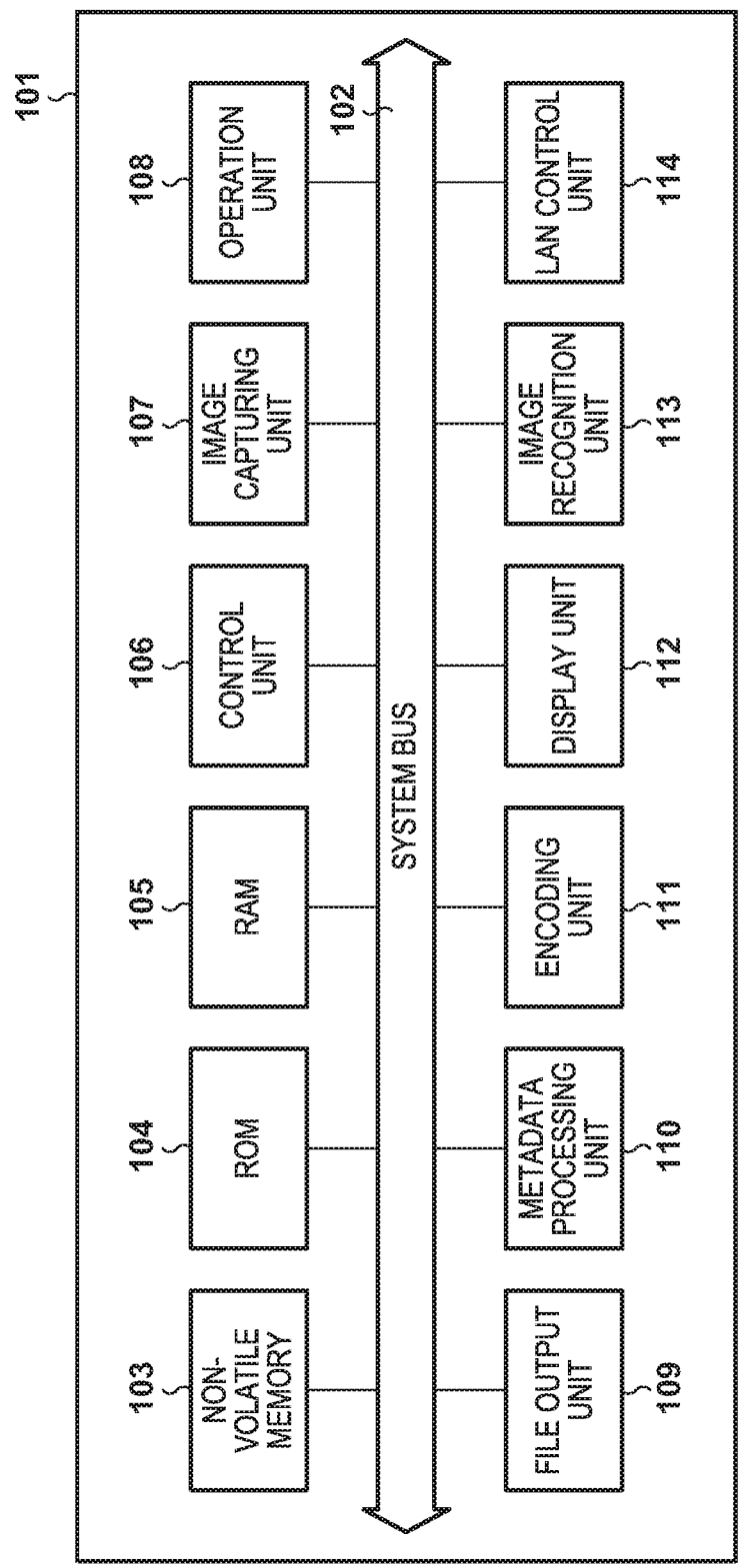
FIG. 1 is a block diagram illustrating a configuration example of an information processing apparatus.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In the present embodiment, an information processing apparatus will be described that generates a High Efficiency Image File Format (HEIF) file including one or more image data. Note that the HEIF is an image file format defined in ISO/IEC 23008 Part 12. The HEIF file has been assumed to store a plurality of image data satisfying a specific condition, for example, continuous image capturing. However, to include, in the HEIF file, a group of image data that matches the intention of the user, the user disadvantageously needs to perform an editing operation on the generated HEIF file and to manually designate image data to store. In contrast, in a case where an HEIF file is generated, the information processing apparatus according to the present embodiment accepts a designation of a condition to be satisfied by a group of image data to be stored in one file. The information processing apparatus obtains image data and then automatically stores, in one file, image data satisfying the designated condition to generate an HEIF file. This allows the group of image data matching the intention of the user to be easily and automatically included in the HEIF file.

In recent years, image generation apparatuses such as cameras and smartphones have had a multi-functional ability and thus is capable of generating various information including not only an image capture date, an image size, and image quality, but also information pertaining to the time of image capturing, meta information about captured image data, and the like. As an example, the image generation apparatuses may generate, along with image data, a large number of information associated with the image data, such as information about the location of image capturing, information allowing recognition and identification of what objects and scenes in the image data are, and an image capturing mode used at the time of image capturing. Accordingly, the information processing apparatus according to the present embodiment allows setting of the above-described condition in accordance with the information.

Note that the description of the present embodiment focuses on generation of an HEIF file but that no such limitation is intended and that the following discussion is also applicable to, for example, generation of a Multi-image Application Format (MiAF) file. Additionally, the above-described condition may be allowed to be set based on information obtained by an apparatus different from the image generation apparatuses (for example, an image analysis apparatus).

Hereinafter, a flow of processing executed will be described after an apparatus configuration is described for the information processing apparatus executing the processing as described above.

Apparatus Configuration

FIG. 1 is a configuration example of an information processing apparatus 101 according to the present embodiment. Note that the information processing apparatus 101 is an electronic apparatus having an image capturing function, for example, a camera, a smart phone, a tablet PC and the like, but that no such limitation is intended and that the information processing apparatus 101 may be, for example, any apparatus capable of collecting image data generated in advance and associated information. That is, the information processing apparatus 101 may be a file editing apparatus configured to read an image file of an image file format or of any other format, input an image, and store the image in one image file format. Additionally, in such a case, the information processing apparatus 101 may be configured as one apparatus but may be composed of a plurality of apparatuses included in a system such as a cloud. Additionally, the information processing apparatus 101 may be an apparatus built in an electronic apparatus or the like as described above or may be peripheral equipment externally connected to the electronic apparatus.

As an example, the information processing apparatus 101 is configured to include a non-volatile memory 103, a ROM 104, a RAM 105, a control unit 106, an image capturing unit 107, and an operation unit 108. The information processing apparatus 101 further includes a file output unit 109, a metadata processing unit 110, an encoding unit 111, a display unit 112, an image recognition unit 113, and a LAN control unit 114. Note that these elements are connected to a system bus 102 and can transmit and receive information to and from one another. The elements described above may each be a hardware element or may be software elements at least some of which are implemented by the control unit 106 executing programs stored, for example, in the ROM 104. Additionally, at least some of the elements may be implemented by a combination of dedicated hardware and software.

The non-volatile memory 103 is one or more recording media such as an SD card, a compact flash (trade name), and a flash memory. The non-volatile memory 103 may, in some cases, include a plurality of types of recording media. The ROM 104 is a read-only memory and is a non-volatile storage apparatus storing software programs corresponding to processing executed by the information processing apparatus 101. The programs stored in the ROM 104 are transferred to the RAM 105 and read and executed by each element such as the control unit 106. The RAM 105 is a random access memory and is a main storage unit of the information processing apparatus 101. The RAM 105 is primarily used as a temporary storage area for data when each element executes processing.

The control unit 106 performs overall control of the image processing apparatus 101. The control unit 106 may be any processor such as a CPU or an MPU which, for example, reads, from the ROM 104, and executes an Operation System (OS) program. Note that CPU is an acronym for Central Processing Unit and that MPU is an acronym for Micro Processing Unit. The control unit 106 is configured to execute at least a part of the processing described below; and control of other elements, for example, by reading, from the ROM 104, and executing programs corresponding to various drivers and applications. Additionally, the control unit 106, for example, transmits data to the display unit 112 to cause the display unit 112 to display the result of processing on a screen, transmits, to the image capturing unit 107, an instruction to automatically release a shutter, and notifies the metadata processing unit 110 of metadata information to be stored in a file. Additionally, the control unit 106 may be configured to include other processors such as an application specific integrated circuit (ASIC) and a digital signal processor (DSP).

The image capturing unit 107 is configured to include an image sensor such as an optical system or a CMOS sensor and execute image capturing processing in accordance with an instruction from the control unit 106 to obtain an image signal. The image capturing unit 107 is configured to input the obtained image signal to the encoding unit 111. The operation unit 108 is configured to accept a user operation and outputs information indicating the result of operation acceptance to the control unit 106. Based on the user operation accepted by the operation unit 108, the control unit 106 may execute processing such as changing the display of the display unit 112, instructing the image capturing unit 107 to capture an image, and instructing the LAN control unit 114 to make a connection.

The file output unit 109 is configured to output, in a prescribed format, a file processed in the metadata processing unit 110 and the encoding unit 111. The output files are saved to the non-volatile memory 103. The metadata processing unit 110 is configured to receive the data encoded by the encoding unit 111 and execute data processing for generating a file in a format according to a prescribed file format standard. The metadata processing unit 110 is configured to execute format processing for storing metadata in a file and generate, for example, in a case where the file format to be processed is the HEIF, a file in a format compliant with HEIF standard specifications. The metadata processing unit 110 is also configured to execute data processing to generate a file in any other format such as a moving image file format defined by MPEG or the like; or a still image format such as JPEG in accordance with an instruction from the control unit 106. The encoding unit 111 is configured to encode an image signal input from the image capturing unit 107 and convert the image signal to digital data. The encoding unit 111 is also configured to decode images and image files stored in the non-volatile memory 103 of the information processing apparatus 101. In a case of executing reproduction process of a moving image or a still image in accordance with a user operation, the encoding unit 111 decodes the corresponding data and outputs the decoded data to the display unit 112. The display unit 112 is configured to display, on the screen, various information such as decoded image data and a user interface (UI) screen for user operations. The image recognition unit 113 is configured to recognize a person, an object, a scene, and the like from an image signal input from the image capturing unit 107 or a file stored in the non-volatile memory and send information about the recognized person or the like to the control unit.

The LAN control unit 114 is a communication interface used to connect to a Local Area Network (LAN) and is configured to perform communication control for communication over a wired LAN or wireless LAN. For example, in a case where the information processing apparatus 101 connects to a wired LAN, the LAN control unit 114 includes hardware circuitry configured to execute processing for a physical (PHY) layer and a media access control (MAC) layer in a transmission medium. In a case of a configuration that connects with a wired LAN, the LAN control unit 114 corresponds to, for example, a Network Interface Card (NIC) for Ethernet (trade name). Additionally, in a case where the information processing apparatus 101 is configured for connection using a wireless LAN, the LAN control unit 114 performs communication control for communication via a wireless LAN compliant with the IEEE 802.11 standard family such as IEEE 802.11a/b/g/n/ac. In this case, the LAN control unit 114 includes a controller, an RF circuit, and an antenna configured to control the PHY layer and the MAC layer compliant with the standard.

Flow of Processing

Now, with reference to FIG. 2, a flow of processing will be described in which the information processing apparatus 101 generates an image file format (e.g. the HEIF). The present processing is executed, for example, each time the information processing apparatus 101 captures an image using the image capturing unit 107 or externally obtains image data. However, no such limitation is intended, and for example, in response to the information processing apparatus 101 accepting an instruction from a user, the present processing may be executed on image data stored inside the information processing apparatus 101. Note that the present processing is mainly executed in the control unit 106, the metadata processing unit 110, and the file output unit 109. Note that, in the present embodiment, a case of generating an HEIF file will be described but that the following discussion is applicable to a case where a file of a prescribed file format capable of storing one or more data is generated.

Figure 3:
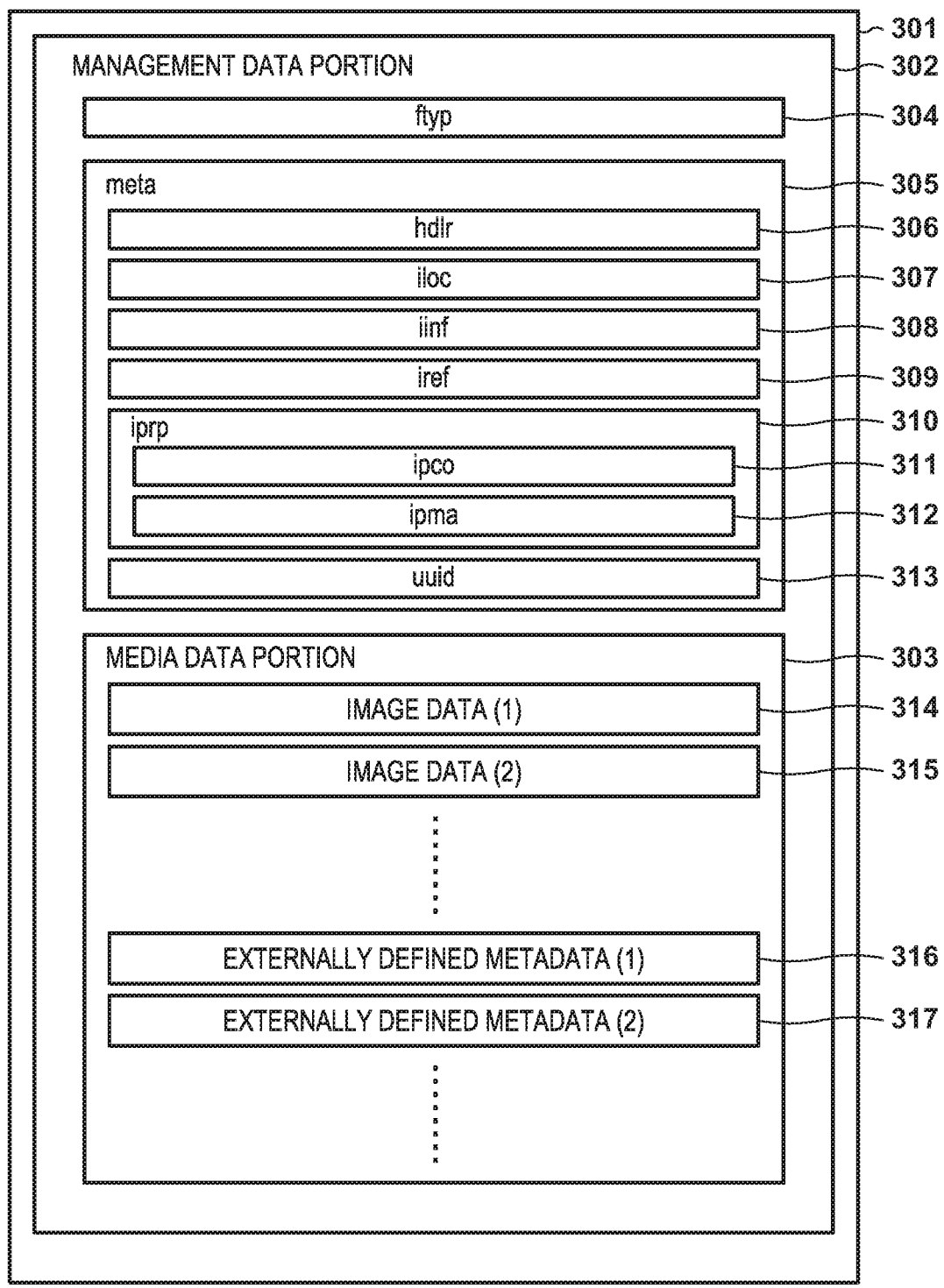
FIG. 3 is a diagram illustrating an example of an image file format to be generated.

First, before description of the processing, the configuration of an HEIF file generated by the information processing apparatus 101 will be described using FIG. 3. In a common and simple format, an HEIF file 301 includes a management data portion 302 and the media data portion 303. The management data portion 302 stores file management data including information pertaining to encoding of media data, information pertaining to a method of storage in the HEIF file, and the like.

The media data portion 303 stores data (media data) obtained by encoding content data (moving images, still images, and audio data), metadata referencing an external standard, and the like. In the media data portion 303, encoded images and data blocks such as Exif are stored in a Box referred to as a MediaDataBox. A cluster of each image data is stored in data 314 and 315, and metadata blocks defined in the external standard such as Exif data blocks are stored in data 316 and 317.

The management data portion 302 includes structural information referred to as Box, and each Box is distinguished from one another by respective type identifiers. A Box 304 is FileTypeBox, distinguished by an identifier "ftyp". The Box 304 is used to identify the type of a file, and the file format is identified by a four-character identifier referred to as a brand. The HEIF file is represented by a four-character identifier such as "mif1" or "msf1" that identifies the brand. A Box 305 is referred to as MetaBox and identified by the identifier "meta". The Box 305 stores various Boxes and stores Boxes of image items and untimed metadata such as metadata items associated with the image items. A Box 306 is referred to as HandlerReferenceBox and is identified by an identifier "hdlr". A handler type in HandlerReferenceBox identifies the structure and format of a content included in MetaBox. In the HEIF file, a four-character identification code "pict" is used as the handler type. A Box 307 is referred to as ItemLocationBox and identified by an identifier "iloc". ItemLocationBox describes information indicating an ID for each item and a location where the item is stored. By referencing this information, an apparatus obtained the HEIF file is capable of determining where the data of an item defined in the management data portion 302 is present. A Box 308 is referred to as ItemInfomationBox and identified by an identifier "iinf". In the Box 308, ItemInformationEntry is defined for each item, and information such as the ID, type, and name of the item is stored in this entry.

A Box 309 is referred to as ItemReferenceBox and identified by an identifier "iref". ItemReferenceBox associates items having a reference relationship with one another, and stores information indicating, for example, what reference type the reference relationship is. In a case where one item is configured by referencing a plurality of items, the IDs of the referenced items are described in sequence. For example, in a case where an item 1 references an item 2 to configure a thumbnail image, "thmb" indicating a thumbnail image is stored as a reference type. Additionally, the ID indicating the item 1 is stored in "from_item_id", and the ID indicating the item 2 is stored in "to_item_id". Additionally, in a case where one image is divided into a plurality of tiles that are stored in the HEIF file, information is defined that indicates the association among the tiles. For example, an image configured as one image is designated as the item 1. Additionally, a plurality of tiles into which the image item is divided are designated as the item 2, an item 3, an item 4, and an item 5. In this case, information is stored that can specify that the single item 1 is formed from the images of the item 2, the item 3, the item 4, and the item 5. For example, "dimg" indicating a derivative image is stored as the reference type. Additionally, the ID indicating the item 1 is stored in "from_item_id", and all of the IDs indicating the item 2, the item 3, the item 4, and the item 5 are stored in "to_item_id". This description allows an apparatus obtained the HEIF file to recognize that the tiles into which the image item is divided are reconfigured into one image. Besides, the Box 309 may describe a reference relationship with metadata defined in the external standard such as Exif referenced by the image. In this case, "cdsc" is used as the reference type, the ID of the item indicating Exif information is stored in "from_item_id", and the ID indicating the image item is stored in "to_item_id".

A Box 310 is referred to as ItemPropertyBox and identified by an identifier "iprp". The Box 310 stores property information applied to each item, and Boxes (Box 311 and Box 312) indicating how to configure the property. A Box 311 is referred to as ImagePropertyContainerBox and identified by an identifier "ipco". The Box 311 stores a Box describing each property. In this case, various Boxes are defined as a Box stored in the Box 311. For example, the Box 311 stores a Box indicating the size of the image, a Box indicating color information, a Box indicating pixel information, or a Box storing HEVC parameters, as necessary. These file formats are common to a Box structure defined in ISO/IEC23008 Part 12. A Box 312 is referred to as ItemPropertyAssociationBox and identified by an identifier "ipma". The Box 312 describes, for each item, an item property configuration, and the indexes of properties applied to the item are described in sequence.

A Box 313 is referred to as UniversalUniqueIdentifiersBox and identified by an identifier "uuid". The Box 313 is a user-definable Box and allows a user-specific Box to be defined using an extended type. Using the Box 313 allows a user-specific definition of a data structure in the Box. For example, the Box 313 may be used to describe information indicating what condition is set for image data stored in the image file. For example, in a case where an image file is generated under the condition that 10 image data are stored in one image file, the Box 313 stores tag information indicating that the number of images is a condition for storage; and information allowing the number of images to be determined to be 10. Additionally, various conditions may be described such as, for example, the condition that image data generated within one minute from the storage of the first image is stored as the same image file; and the condition that image data depicting a specific object is stored in one image file. In this case, the data structure can take any form that can be commonly interpreted by a Writer generating a file and a Reader reading a file. In this way, by using the Box 313 to describe the storage condition for the image data, condition information can be stored in the HEIF file in a user-specific format. Additionally, by referencing the Box 313, an apparatus capable of interpreting the user-specific format can easily identify the condition under which the obtained HEIF file is generated. Additionally, the Box 313 may be allowed to be skipped or discarded by an apparatus incapable of identifying the extended type. Note that, as described above, uuid can be used to describe, by the information processing apparatus 101, a storage condition for storing the image data in one image file format but that no such limitation is intended. For example, a Box structure can be separately defined in accordance with the ISO/IEC 23008 Part 12 or the like to allow the storage condition described above to be described. Thus, a more general-purpose configuration can be used to define what condition is used to store the image data in the image file. This enables many apparatuses to interpret the storage condition. On the other hand, by using uuid to store the storage condition in the file as described above, execution of unnecessary processing can be prevented, for example, an apparatus that need not recognize the storage condition can be prevented from interpreting unnecessary data.

Figure 2:
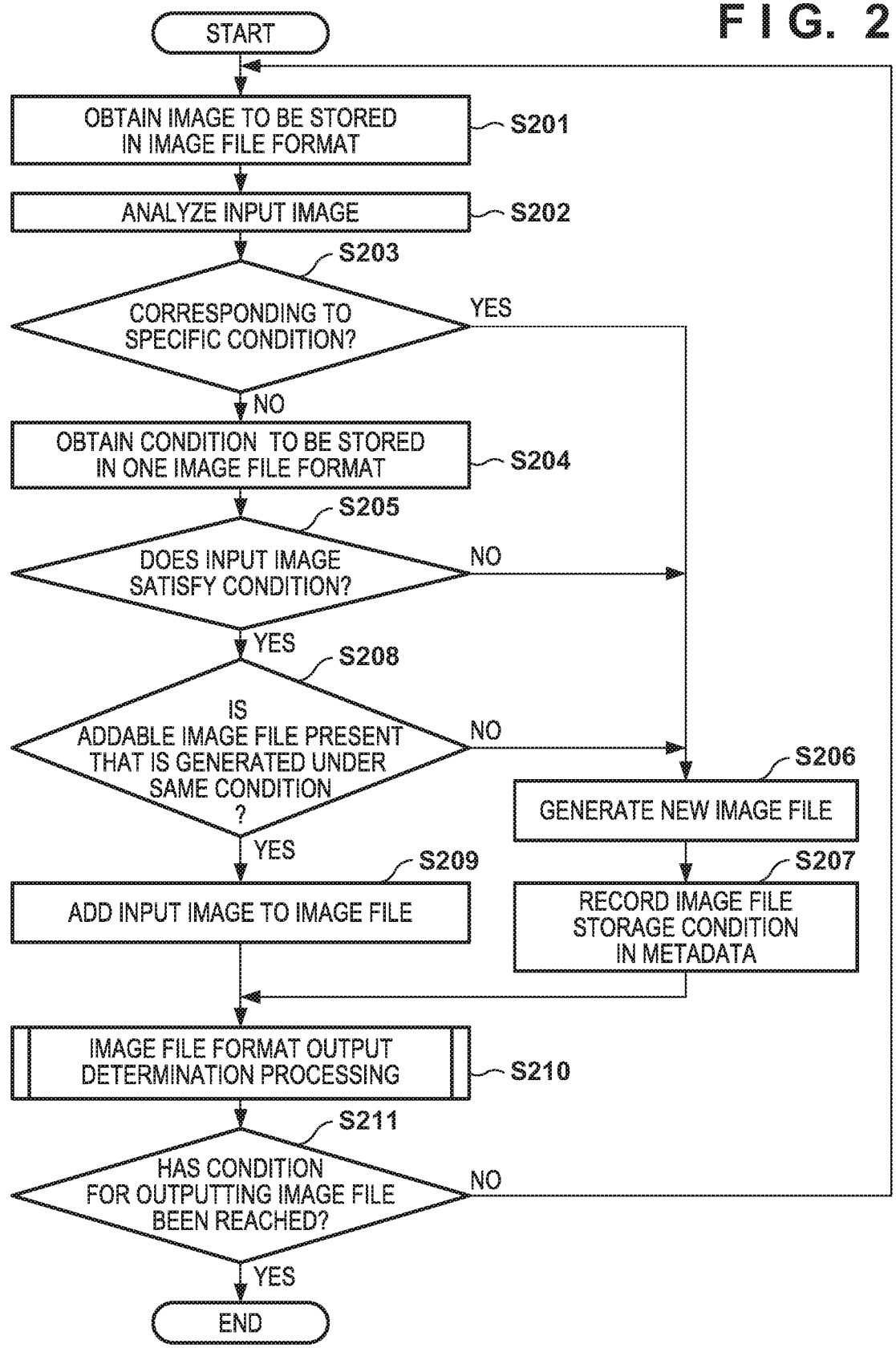
FIG. 2 is a diagram illustrating an example of a flow of image file format generation processing.

In the processing in FIG. 2, first, the information processing apparatus 101 causes the encoding unit 111 to encode the image signal obtained by the image capturing unit 107 to generate image data and supplies the image data to the metadata processing unit 110 (step S201). Note that the obtained image data includes metadata and various information obtained by an image capturing apparatus. The metadata processing unit 110 analyzes the input image data (step S202). Here, the metadata about the input image is analyzed. The metadata processing unit 110 analyzes, for example, the date and time of image generation, image size, and metadata stored in Exif or the like. Additionally, in a case where the condition for including the image data in the HEIF file is a condition pertaining to an object, the metadata processing unit 110 analyzes the object identified from the image by object recognition processing executed on the image data. Additionally, in a case where, for example, the condition that images of the same scene are stored in one image file format is set, the metadata processing unit 110 may analyze the scene in the image data. That is, the metadata processing unit 110 may change the data to be analyzed in accordance with the condition for including the image data in the HEIF file.

Then, the information processing apparatus 101 determines whether the obtained image data corresponds to a specific condition for determining whether the image data is not to be stored in the file under the user-designated condition (step S203). The specific condition may include, for example, the condition that the image data pertains to autobracketing captured images that are captured by using an HDR image capturing mode. At the time of HDR image capturing, a plurality of images continuously captured with varying white balance or sensitivity are synthesized to generate an HDR image. Thus, by designating the specific condition as described above, a plurality of image data obtained by a series of image capturing can be stored in one file regardless of the user-designated condition. In a case of determining that the image data corresponds to a specific condition (YES at step S203), the information processing apparatus 101 advances the processing to step S206. In a case where the image data does not correspond to the specific condition (NO at step S203), the information processing apparatus advances the processing to step S204. Additionally, the information processing apparatus 101 may perform, depending on the condition, processing in which both the processing at step S204 and the processing at step S206 are executed to store the image data in two files. In a case where both the processing at step S204 and the processing at step S206 are executed, the image data satisfying the specific condition is stored in one image file format (step S206) and in another image file format under the user-designated condition (step S204). Additionally, in the above description of the present embodiment, the processing is executed to store, in one image file format, the image data satisfying the specific condition. However, no such limitation is intended. For example, with the specific condition not taken into account, the image data may be stored in one image file format in accordance only with the user-designated setting in the information processing apparatus 101. In this way, based on the specific condition not depending on the user-designated condition, whether the obtained image data is to be stored in one image file format is determined.

At step S204, the information processing apparatus 101 obtains the storage condition to be satisfied by the image data to be stored in one image file format. The information processing apparatus 101 then determines whether the input image data satisfies the storage condition obtained (step S205). The information processing apparatus 101 advances the processing to step S208 in a case where the image data satisfies the storage condition (YES at step S205) and advances the processing to step S206 in a case where the image data does not satisfy the storage condition (NO at step S205). Here, the storage condition is a condition set in the information processing apparatus 101 in advance, for example, by a user operation or the like. Note that a plurality of storage conditions may be designated, and the plurality of storage conditions may each be allowed to be designated by logical operations such as a logical sum and a logical product. Furthermore, depending on the condition, a condition requiring the storage of one image in a plurality of image file formats may be designated. Note that the storage condition may be designated, for example, by a setting file downloaded by the information processing apparatus 101. For example, for setting a manufacturer-designated condition or a condition common to a plurality of the information processing apparatuses 101, a file predefining the storage condition may be generated to allow the information processing apparatus 101 to download the file to set the condition. Note that the specific condition described above may also be changeable by file downloading or user designation.

Figure 4:
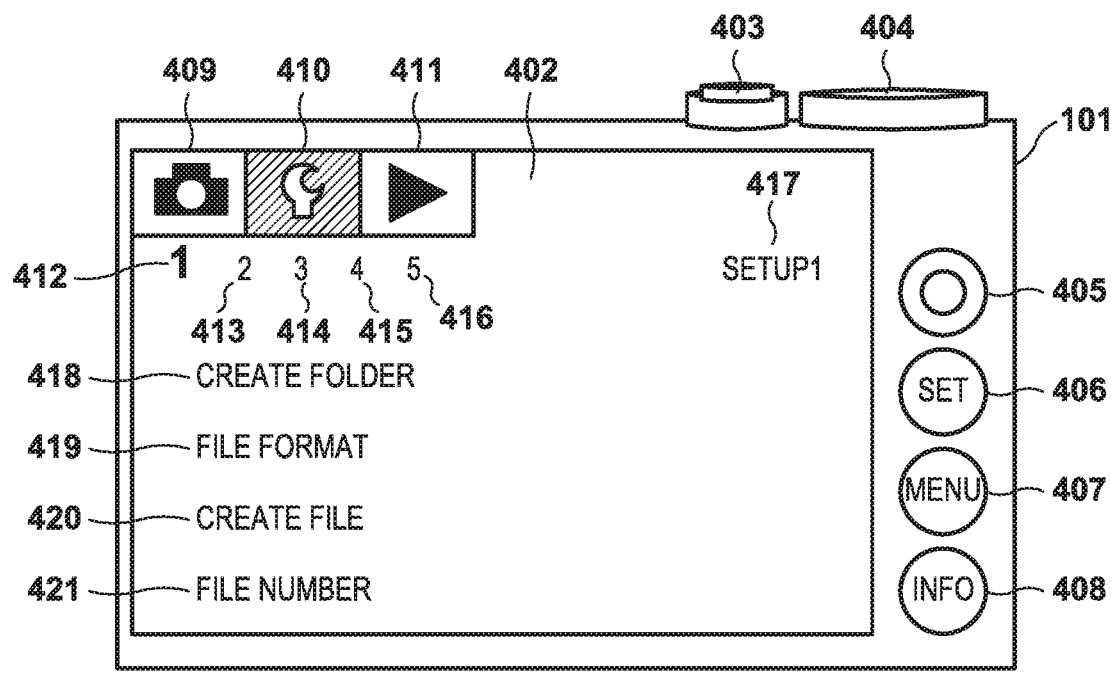
FIG. 4 is a diagram illustrating an example of a user interface of an information processing apparatus.
Figure 5:
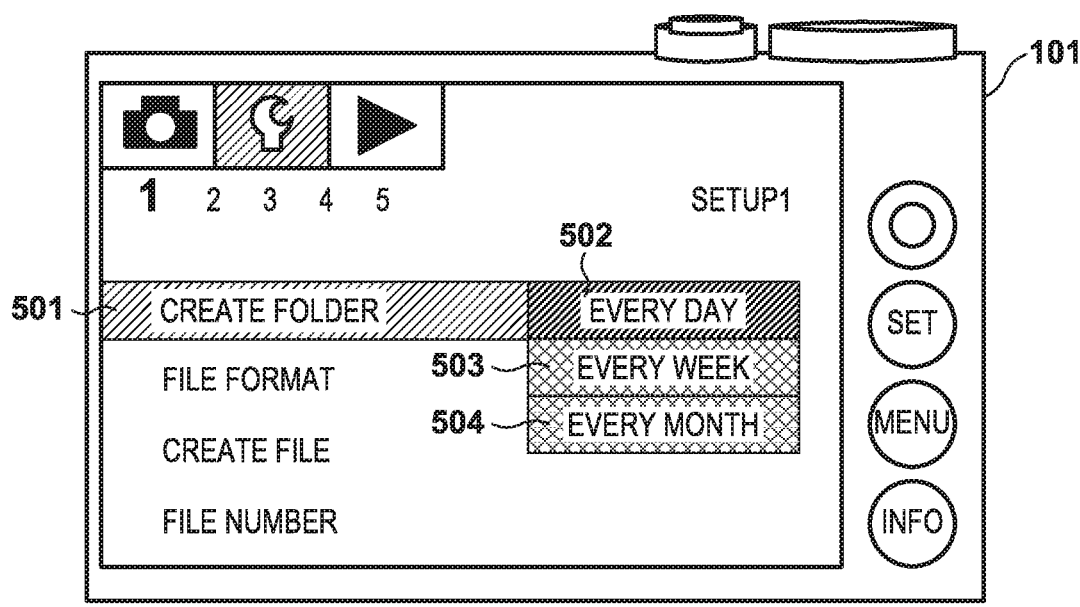
FIG. 5 is a diagram illustrating an example of a user interface of an information processing apparatus.
Figure 6:
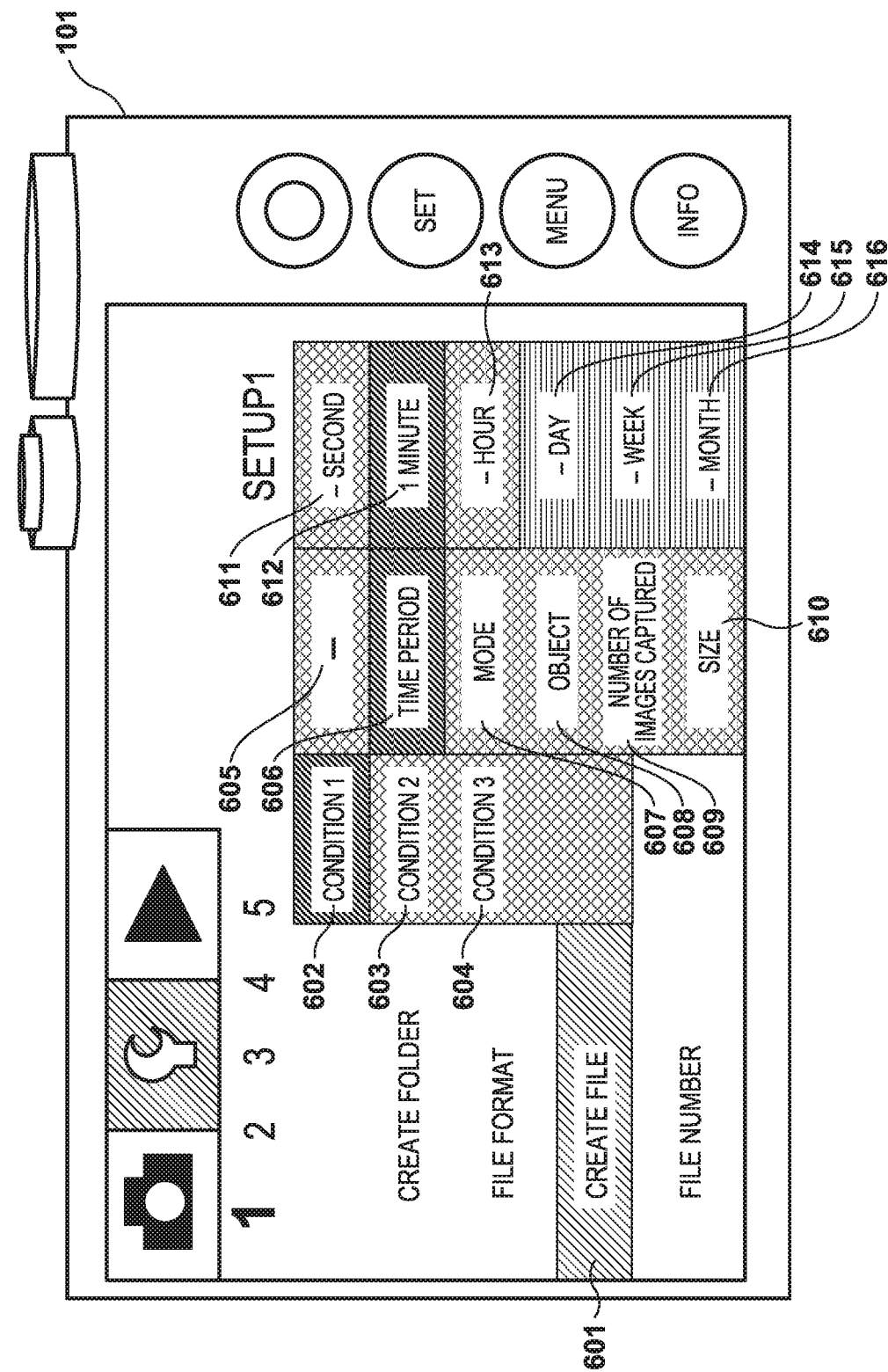
FIG. 6 is a diagram illustrating an example of a user interface of an information processing apparatus.

Here, an example of a method in which the user designates the storage condition will be described using FIGS. 4 to 6. FIGS. 4 to 6 are diagrams illustrating a flow of processing for setting a condition for an image to be stored in an image file format in the information processing apparatus 101, using an example of a user interface (display screen) of the information processing apparatus 101. Here, an example of a case in which the information processing apparatus 101 is a camera is illustrated. However, no such limitation is intended, and any apparatus capable of providing a similar user interface may be used as the information processing apparatus 101. Additionally, as long as the condition can be designated, a configuration other than those illustrated in FIGS. 4 to 6 may be used. For example, a condition may be input using an external keyboard or designated by downloading a file.

The information processing apparatus 101 includes, as operation functions, a display 402 including a touch panel, a shutter button 403, a dial 404, a recording button 405, and operation buttons 406 to 408. The display 402 is configured to display a screen and accept various user operations on items displayed by the touch panel. The shutter button 403 is an operation button to be pressed by a user when capturing an image. The dial 404 is configured to accept a mode selection provided by the user. The user can operate the dial 404 to change a mode used at the time of image capturing. The recording button 405 is an operation button configured to start and end moving image capturing in response to being pressed by a user. The button 406 is a button configured to be utilized by the user for a setting operation. The button 407 is a button configured to be utilized by the user to display a menu screen. The button 408 is a button configured to be operated by the user in displaying various information. These function units are included in the information processing apparatus 101 as a physical configuration.

Now, a software button configuration will be described that is displayed on the display 402 as operation items and that is operated using the touch panel, physical buttons, and the like described above. A tab 409 is a tab selected for setting pertaining to a condition used at the time of image capturing. In a case where the user touches a portion in the screen corresponding to the tab 409, the screen of the information processing apparatus 101 transitions to a setting screen for the image capturing condition. In the setting provided at the time of image capturing, for example, setting of recording image quality, exposure, and ISO sensitivity can be performed. Furthermore, in the setting provided at the time of image capturing, a person as an object for image capturing can be registered. The registration allows a condition for the object to be set to enable a plurality of image data including a specific object to be stored in one image file format. A tab 410 is a tab selected for various settings pertaining to the information processing apparatus 101. In a case where the user touches the tab 410 in the screen, the screen of the information processing apparatus 101 transitions to a setting screen for various settings for the information processing apparatus 101. Setting in the tab 410 allows the user to set a condition for image data to be stored in one image file format. Additionally, the user can also use the tab 410 to perform a setting of setting items for a network such as a wireless LAN, and other settings. A tab 411 is a setting tab pertaining to reproduction of image data saved in non-volatile memory in the information processing apparatus 101. In a case where the user touches the tab 411 in the screen, the screen of information processing apparatus 101 transitions to a setting screen pertaining to reproduction of image data saved in non-volatile memory in information processing apparatus 101. The setting in the tab 411 allow the user to perform a setting pertaining to reproduction display, to delete a recorded image, and to perform a setting pertaining to simple editing such as resizing or trimming.

An item 412 includes a first type of setting for various setting menus. Similarly, an item 413 includes a second type of setting, an item 414 includes a third type of setting, an item 415 includes a fourth type of setting, and an item 416 includes a fifth type of setting. In one example, an item corresponding to a valid one of the setting types (item 412) is displayed larger and thicker than the items corresponding to the other setting types. Note that any other display may be used that enables determination of the valid setting type. For example, an icon (number) corresponding to the valid setting type and a background for the icon (number) may be displayed in a color different from the color of the icons (numbers) corresponding to the other setting types and backgrounds for the icons (numbers). Additionally, "SETUP1" indicated by an item 417 displays a setting type number, and the user can check the item 417 to determine which of the setting types the user is manipulating.

An item 418 indicates a setting item pertaining to folder creation. The user can select (touch) the item 418 to perform a setting pertaining to folder creation. A screen transition resulting from selection of the item 418 will be described below using FIG. 5. An item 419 indicates a setting item pertaining to a file format. The user can select (touch) the item 419 to designate the file format (recording format). In setting the file format, the user can select whether to record image data in the image file format, in a JPEG format, or as a RAW image. The user can also provide a setting allowing one image data to be recorded in a plurality of formats. In a case where the user selects a setting of a file format including the image file format, the condition for storage in the image file format as described in the present embodiment can be designated. An item 420 indicates a setting item pertaining to file creation. The user can select (touch) the item 420 to designate a condition for images to be stored in one file when the image file format is created. A screen transition resulting from selection of the item 420 will be described below using FIG. 6. An item 421 indicates a setting item pertaining to a numbering method for the file number. The user can select (touch) the item 421 to designate the numbering method for the file number.

A user interface resulting from selection of the item 418 (folder creation setting) will be described using FIG. 5. Selection of the item 418 causes the information processing apparatus 101 to provide display enabling determination of selection of the folder creation setting, for example, by changing the background color as illustrated at an item 501. Folders are created at every time period when image capturing is performed, for example, every day, every week, or every month. The time periods are represented by an item 502 (every day), an item 503 (every week), and an item 504 (every month). The selection, by the user, of the item 502 causes folders to be generated in the non-volatile memory each time the date changes, and a file resulting from processing such as image capturing is stored in a folder corresponding to the date of generation of the file. Similarly, the selection, by the user, of the item 503 causes folders to be generated every week, and a file resulting from image capturing or the like during the week is stored in a folder corresponding to the week to which the date of generation of the file belongs. Additionally, the selection, by the user, of the item 504 causes folders to be generated every month, and a file resulting from image capturing or the like during the month is stored in a folder corresponding to the month to which the date of generation of the file belongs. Note that, in a case of accepting the selection of each item, the information processing apparatus 101 may accept input of a numerical value and generate folders at each time period corresponding to the numerical value. For example, in a case of accepting a numerical value of 5 after accepting the selection of the item 502, the information processing apparatus 101 may operate to generate folders every five days. For a period when no file is output, no folder is created. FIG. 5 illustrates that the item 502 is selected. For example, the item 502 is displayed such that the background color is changed to enable determination of selection of the folder creation setting on a daily basis.

Now, a user interface resulting from selection of the item 420 (designation of a condition for images stored in one file) will be described using FIG. 6. Selection of the item 420 causes the information processing apparatus 101 to provide display enabling determination of selection of the folder creation setting, for example, by changing the background color as illustrated at an item 601. The file creation setting allows one or more conditions to be set for images to be stored in one file. The conditions are represented by an item 602 (condition 1), an item 603 (condition 2), and an item 604 (condition 3). Separate conditions may be set for the respective items 602 to 604. FIG. 6 illustrates that the item 602 (condition 1) is selected. Display is provided such that, for example, the background color is changed to allow determination of the selected condition.

Each of the conditions includes items for condition setting such as items 605 to 610. Note that each of these conditions can be designated by logical operations such as a logical sum and a logical product. Alternatively, instead of such designation, predetermined logical operations may be used to define the relationship in each condition. Additionally, each condition may be designated at a plurality of items or exclusively at one item.

The item 605 is an item indicating that no condition is designated, and the selection, by the user, of this item allows none of the conditions to be designated. In this case, the information processing apparatus 101 is configured to store image data in one file under a predetermined default condition. The default condition may be such as, for example, the condition that only one image data is stored in one file or the condition that the image data captured by continuous shooting is stored in one file. As in the processing described using FIG. 7, the information processing apparatus 101 may operate to prevent the condition from being applied in a case where a file is output, depending on the remaining capacity of the non-volatile memory 103.

The item 606 is an item for designating a condition for a time period. The selection, by the user, of the item 606 enables to set a time period at which the image data is stored in one file. The condition for the time period can be selected from any of, for example, a unit of seconds (item 611), a unit of minutes (item 612), a unit of hours (item 613), a unit of days (item 614), a unit of weeks (item 615), and a unit of months (item 616). Note that, in response to the selection of any of the items, input of a numerical value is accepted. For example, in a case where a numerical value of 5 is input after the item 612 is selected, the condition that the image data is stored in one file in a unit of five minutes. Note that, as described using FIG. 5, in a case where the intervals for folder creation is set, only the units of time each shorter than the interval can be set. For example, in a case where selection of the item 502 causes folders to be generated every day, the unit of days (item 614), the unit of weeks (item 615), and the unit of months (item 616) may be prevented from being selected. Note that selectable conditions and non-selectable conditions may be distinguishably displayed by changing the background color, for example, as illustrated in FIG. 6. In FIG. 6, as a condition 1 (item 602), a condition pertaining to a time period (item 606) is selected, and for the details, a setting is designated in which the image data is stored in one file in a unit of 1 minute (item 612). Under this setting, for images captured within one minute from capturing of the first image, the image data is stored in one image file format.

The item 607 is an item for designating a condition for the mode. The selection, by the user, of this item enables setting of a condition requiring the storage, in one file, of image data resulting from image capturing in a particular image capturing mode. The mode may be a mode for creating an HDR photograph. In this case, for example, the condition that bracket images resulting from image capturing for creation of an HDR photograph are stored in one file may be designated. The mode can also be a continuous shooting image capturing mode. In this case, the condition that image data resulting from continuous shooting image capturing is stored in one file may be designated. Besides, a condition for storing, in one file, image data captured by one operation in the same mode may be designated. Note that a condition for storing, in one file, a plurality of image data resulting from image capturing in a plurality of modes may be set. For example, by designating two or more modes and further, for example, by setting the condition for the time period at the item 606, a condition can be set that requires the storage, in one file, of all of the image data captured in the designated modes within the prescribed time period.

The item 608 is an item for designating a condition for an object. The selection, by the user, of this item enables a setting a condition requiring the storage, in one file, of image data depicting a specific object. This setting causes image data depicting the designated object to be stored in one file. Note that in a case where image data depicting a plurality of objects is present, the image data may be stored in a plurality of files; or in one file corresponding to an object on which a central focus is placed within the image data. Additionally, for image data not depicting the designated object, one image data may be stored in one file. The item 609 is an item for designating a condition for the number of captured images. The selection, by the user, of this item allows designation of the number of images stored in one file. For example, in a case where the condition for the number of captured images is set to 10 and where image data of 10 images is included in a file, processing is executed in which a new image file format is generated with no further image data being included in the file. The item 610 is an item for designating a condition for a size. The selection, by the user, of this item causes generation of a new image file format in which images are stored in a case where the size of the file exceeds (has exceeded) a designated size. Note that designating a size smaller than or equal to the size of one image is precluded. When a new image file format is generated, the image file format in which the image data has heretofore been stored is output as a file. Note that the above items are examples, and other items may be used as conditions. For example, items for designating conditions for a scene may be present.

Referring back to FIG. 2, at step S208, the information processing apparatus 101 checks whether an image file format is present that is generated under the storage condition determined at step S205 to be satisfied, the image file format allowing obtained image data to be added to the file. In a case where such an image file format is present (YES at step S208), the information processing apparatus 101 advances the processing to step S209. In a case where no such image file format is present (NO at step S208), the information processing apparatus 101 advances the processing to step S206. Note that, in a case where the image data needs to be stored in a plurality of files based on each of a plurality of storage conditions, the determination at step S208 and the processing at step S206 or step S209 may be executed for each condition.

At step S209, the information processing apparatus 101 stores image data obtained at step S201 in an image file format generated on the RAM. At this time, the information processing apparatus 101 also adds associated metadata to the image file format. Note that, as described above, one image data may be stored in a plurality of files. After step S209, the information processing apparatus 101 advances the processing to step S210.

On the other hand, at step S206, the information processing apparatus 101 generates a new image file format and stores the image data obtained at step S201 in the image file format. Note that the information processing apparatus 101 may limit the number of image files that can be generated at the same time (the number of image file formats under editing). Thus, the capacity of the RAM required in the present processing can be reduced. Note that, in a case where the information processing apparatus 101 attempts to generate image files beyond a limit quantity, the information processing apparatus 101 may output any of the image file to the non-volatile memory 103. In this case, which of the image files is output to the non-volatile memory 103 may be selected in any manner, allowing a target to be reasonably selected. Additionally, the number of image files that can be generated at the same time may be limited to one, and in a case where image data is obtained that is based on a condition different from the condition for the image file under generation, the image file under generation may be output to the non-volatile memory 103. In a case where, for a newly generated image file format, the stored image data is determined at step S205 to be satisfying the storage condition, the information processing apparatus 101 stores the storage condition (step S207). Note that, in a case where the image data to be stored is determined at step S205 to be not satisfying storage conditions, the information processing apparatus 101 may output the image file format as a file to the non-volatile memory 103 with no storage condition included in the image file format. After step S207, the information processing apparatus 101 advances the processing to step S210.

At step S210, the information processing apparatus 101 determines whether to output the image file format to the non-volatile memory 103 or the like as a file. Now, the processing at step S210 will be described using FIG. 7. In the processing in FIG. 7, the information processing apparatus 101 first determines whether the file generated at step S209 or the file generated at steps S206 and S207 has a size larger than the remaining capacity size of the non-volatile memory (e.g., non-volatile memory 103) in which the image file format is to be recorded (step S701). In a case of determining that the file size exceeds the remaining capacity size of the storage area (YES at step S701), the information processing apparatus 101 advances the processing to step S702. In addition, in a case where the information processing apparatus 101 determines that the file size does not exceed the remaining capacity size of the storage area (NO at step S701). Note that, in the present embodiment, the example has been described in which the determination at step S701 is performed after image data is newly obtained at step S201, but that the determination at step S701 may be performed as pre-processing in accordance with a predicted captured image size.

At step S707, the information processing apparatus 101 determines whether a condition for ending the storage of the image data in the image file format is reached. In a case of determining that the end condition is reached (YES at step S707), the information processing apparatus 101 advances the processing to step S708. In a case of determining that the end condition is not reached (NO at step S707), the information processing apparatus 101 ends the processing.

At step S702, the information processing apparatus 101 determines whether a non-volatile memory other than the non-volatile memory designated as a recording destination has a remaining capacity. In a case where another non-volatile memory has a remaining capacity (YES at step S702), the information processing apparatus 101 advances the processing to step S706. In a case where no other non-volatile memory has a remaining capacity (NO at step S702), the information processing apparatus 101 advances the processing to step S703. Note that the determination at step S702 is performed in a case where the information processing apparatus 101 includes a plurality of non-volatile memories. That is, in a case where the information processing apparatus 101 includes no non-volatile memory other than the non-volatile memory 103, the processing may proceed to step S703 with the determination at step S702 not performed. Note that the information processing apparatus 101 may transfer the file stored in the non-volatile memory 103 to an external storage apparatus such as an HDD to increase the remaining capacity of the non-volatile memory 103.

At step S706, the information processing apparatus 101 changes the recording destination of non-volatile memory to a non-volatile memory with a remaining capacity. Note that, in the present embodiment, even in a case where the non-volatile memory under recording has a remaining capacity, the recording destination is changed in a case where the file under generation as an image file format exceeds the remaining capacity but that no such limitation is not intended. For example, recording in another non-volatile memory may be achieved by outputting only a recordable capacity to the file and including the remaining image data in a new image file format.

At step S703, the information processing apparatus 101 uses display of a prescribed message on the screen, lighting/blinking of a prescribed lamp, prescribed audio output, or the like to notify the user that further recording of image data is prevented. The information processing apparatus 101 then discards the obtained image data (step S704) and checks whether there remains any image file format not output as a file (step S705). In a case where there remains an image file format not output as a file (YES at step S705), the information processing apparatus 101 advances the processing to step S708. In a case where no such image file format is present (NO at step S705), the information processing apparatus 101 ends the processing. At step S708, information processing apparatus 101 outputs the image file format to the non-volatile memory as a file.

Note that, in addition to being executed at step S210 in FIG. 2, the processing in FIG. 7 may be performed in response to expiration of a timer or the like. For example, in a case where the storage condition that periodically obtained image data is stored in one image file format is defined, the processing in FIG. 7 is executed in response to elapse of a designated time period from the storage of the first image data in the image file format. Additionally, the file output may be performed in response to the user switching the image capturing mode.

Referring back to FIG. 2, at step S211, information processing apparatus 101 determines whether the condition for outputting all the image files is satisfied. For example, the information processing apparatus 101 may determine that the condition is satisfied in a case where a user instruction to end the processing of storing the image data in the image file format is accepted. Additionally, the information processing apparatus 101 may determine that the condition is satisfied, for example, in a case where no image data is obtained for a prescribed time period. In a case of determining that the condition is satisfied (YES at step S211), the information processing apparatus 101 outputs the image file to the non-volatile memory 103 and ends the processing. In a case whereas determining that the condition is not satisfied (NO at step S211), the information processing apparatuses returns the processing to step S201.

Note that in the embodiment described above, the image file is described as being output to the non-volatile memory but that no such limitation is intended. For example, the information processing apparatus 101 may store image files in an external apparatus or in another built-in storage apparatus. Additionally, for example, in a case where the information processing apparatus 101 is composed of a system such as a cloud, the information processing apparatus 101 may execute processing such as transmission of a file to a client via a network.

As described above, in the present embodiment, the information processing apparatus 101 accepts a designation of a storage condition to be satisfied by image data to be stored in one image file format. The information processing apparatus 101 then determines whether image data input due to image capturing or an editing operation satisfies the designated condition and stores, in one image file format, image data that satisfies the condition. The information processing apparatus 101 also stores, in another image file format, image data not satisfying the condition. This allows the image data satisfying the storage condition designated by the user in advance to be automatically placed together in one image file format.

Here, a storage condition that requires the storage, in one image file format, of image data generated within a first specific time period may be designated. Alternatively, a setting may be provided in which files generated within a second specific time period are stored in one folder. In this case, the information processing apparatus 101 may inhibit a designation of a first specific time period that is longer than the second specific time period. This may prevent image data stored over two folders from being stored in one image file. In this case, as illustrated in FIG. 6, by providing display enabling determination of whether a condition can be designated in relation to folder settings, convenience for the user in designation of a condition can be improved. Note that even in a case where the first specific time period is set shorter than the second specific time period, the first specific time period may span two second specific time periods. In this case, image data spanning the two second specific time periods may or may not be stored in one image file format. That is, one image file format may be output as an image file in response to expiration of the first period of the two second specific time periods, and storage of the image data in another image file format may be started simultaneously with the start of the second period of the two second specific time periods. Additionally, the information processing apparatus 101 may be capable of accepting, as a storage condition, identification information such as the number of images, file size, image capturing mode, object, and scene. Thus, by designating various conditions and storing, in one image file format, image data satisfying the conditions, a file containing image data as intended by the user can be generated. The information processing apparatus 101 may also add, to the file, metadata indicating what condition is satisfied by the image data stored in the file. Thus, the information processing apparatuses 101 can easily determine, when reading the file later, the storage condition pertaining to the file, and an external apparatus provided with the file can also easily determine the storage condition pertaining to the file. This allows an apparatus obtained a file to easily identify a file generated under a specific storage condition and to execute processing such as reproduction.

Additionally, the information processing apparatus 101 may store image data generated under a specific image capturing condition or the like, such as continuous capturing, in one file separate from the file for the user-designated storage condition. This allows a series of image data previously found to have a meaning as an image group to be stored in one file. Furthermore, the information processing apparatus 101 can control the file output in consideration of the remaining capacity of the file output destination. This may prevent loss of the destination to which the file under generation is to be saved and enable reliable outputting of the file as intended by the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-206876, filed on Nov. 1, 2018, which is hereby incorporated by reference herein in its entirety.

What is claimed is:

1. An information processing apparatus that generates a file in a prescribed image file format, the information processing apparatus comprising:
   one or more processors; and
   one or more memories coupled to the one or more processors, wherein the one or more memories store a computer-readable instruction that causes, when executed by the one or more processors, the information processing apparatus to:
   accept a designation of a storage condition to be satisfied by image data to be stored in the prescribed image file format, the storage condition including a condition for an object included in image data or a condition for a scene where image capturing pertaining to image data is performed;

obtain image data;

recognize the object included in the obtained image data or the scene where image capturing pertaining to the obtained image data is performed; and generate the file such that one or more image data included in the obtained image data and satisfying the condition for an object or the condition for a scene are stored in one of the prescribed image file formats and such that image data included in the obtained image data and not satisfying the condition for an object or the condition for a scene is not stored in the one of the prescribed image file formats.

2. The information processing apparatus according to claim 1, wherein the information processing apparatus stores, in another one of the prescribed image file formats, the image data not satisfying the storage condition and generates another file different from the file.

3. The information processing apparatus according to claim 1, wherein, in a case where the obtained image data satisfies a prescribed condition, the information processing apparatus stores the image data in another one of the prescribed image file formats, regardless of whether the image data satisfies the storage condition, and generates another file different from the file.

4. The information processing apparatus according to claim 3, wherein
the prescribed condition is that the obtained image data corresponds to an image obtained by continuous image capturing, and
the information processing apparatus generates a file including a plurality of image data pertaining to a series of images obtained by the continuous image capturing.

5. The information processing apparatus according to claim 1, wherein the information processing apparatus further accepts, for a folder storing a file, a condition to be satisfied by the file to be stored in the folder.

6. The information processing apparatus according to claim 1, wherein the computer-readable instruction further causes, when executed by the one or more processors, the information processing apparatus to display the storage condition acceptable and the storage condition unacceptable in a distinguishable manner, based on a condition to be satisfied by a file to be stored in a folder.

7. The information processing apparatus according to claim 1, wherein the storage condition includes a condition pertaining to a time period in which the image data is generated.

8. The information processing apparatus according to claim 1, wherein the storage condition includes a condition for a number of image data to be stored in the image file format.

9. The information processing apparatus according to claim 1, wherein the storage condition includes a condition for a mode for image capturing used during image capturing pertaining to image data.

10. The information processing apparatus according to claim 1, wherein the storage condition includes a condition for a size of a file obtained by storing the image data in the image file format.

11. The information processing apparatus according to claim 1, wherein the information processing apparatus stores the generated file in a storage.

12. The information processing apparatus according to claim 11 is configured to, in a case where a size of an image file format in which the obtained image data is stored exceeds a remaining capacity of a storage area in the storage, output the image file format to the storage as the file without storing the image data in the image file format.

13. The information processing apparatus according to claim 11, further comprising another storage different from the storage, wherein
in a case where a size of an image file format in which the obtained image data is stored exceeds a remaining capacity of a storage area in the storage and where the size does not exceed a remaining capacity of the storage area in the other storage, the information processing apparatuses sets the other storage as an output destination of the generated file.

14. The information processing apparatus according to claim 1, wherein the information processing apparatus stores the storage condition in the image file format in which one or more image data satisfying this storage condition are stored.

15. The information processing apparatus according to claim 1, wherein the prescribed image file format is an image file format defined in ISO/IEC 23008 Part 12.

16. A control method executed by an information processing apparatus that generates a file in a prescribed image file format, the control method comprising:
accepting a designation of a storage condition to be satisfied by image data to be stored in the prescribed image file format, the storage condition including a condition for an object included in image data or a condition for a scene where image capturing pertaining to image data is performed;

obtaining image data;

recognizing the object included in the obtained image data or the scene where image capturing pertaining to the obtained image data is performed; and generating the file such that one or more image data included in the obtained image data and satisfying the condition for an object or the condition for a scene are stored in one of the prescribed image file formats and such that image data included in the obtained image data and not satisfying the condition for an object or the condition for a scene is not stored in the one of the prescribed image file formats.

17. A non-transitory computer-readable storage medium that stores a program configured to cause a computer, provided in an information processing apparatus that generates a file in a prescribed image file format, to:
accept a designation of a storage condition to be satisfied by image data to be stored in the prescribed image file format, the storage condition including a condition for an object included in image data or a condition for a scene where image capturing pertaining to image data is performed;

obtain image data;

recognize the object included in the obtained image data or the scene where image capturing pertaining to the obtained image data is performed; and generate the file such that one or more image data included in the obtained image data and satisfying the condition for an object or the condition for a scene are stored in one of the prescribed image file formats and such that image data included in the obtained image data and not satisfying the condition for an object or the condition for a scene is not stored in the one of the prescribed image file formats.

\* \* \* \* \*